Patented Oct. 9, 1928.

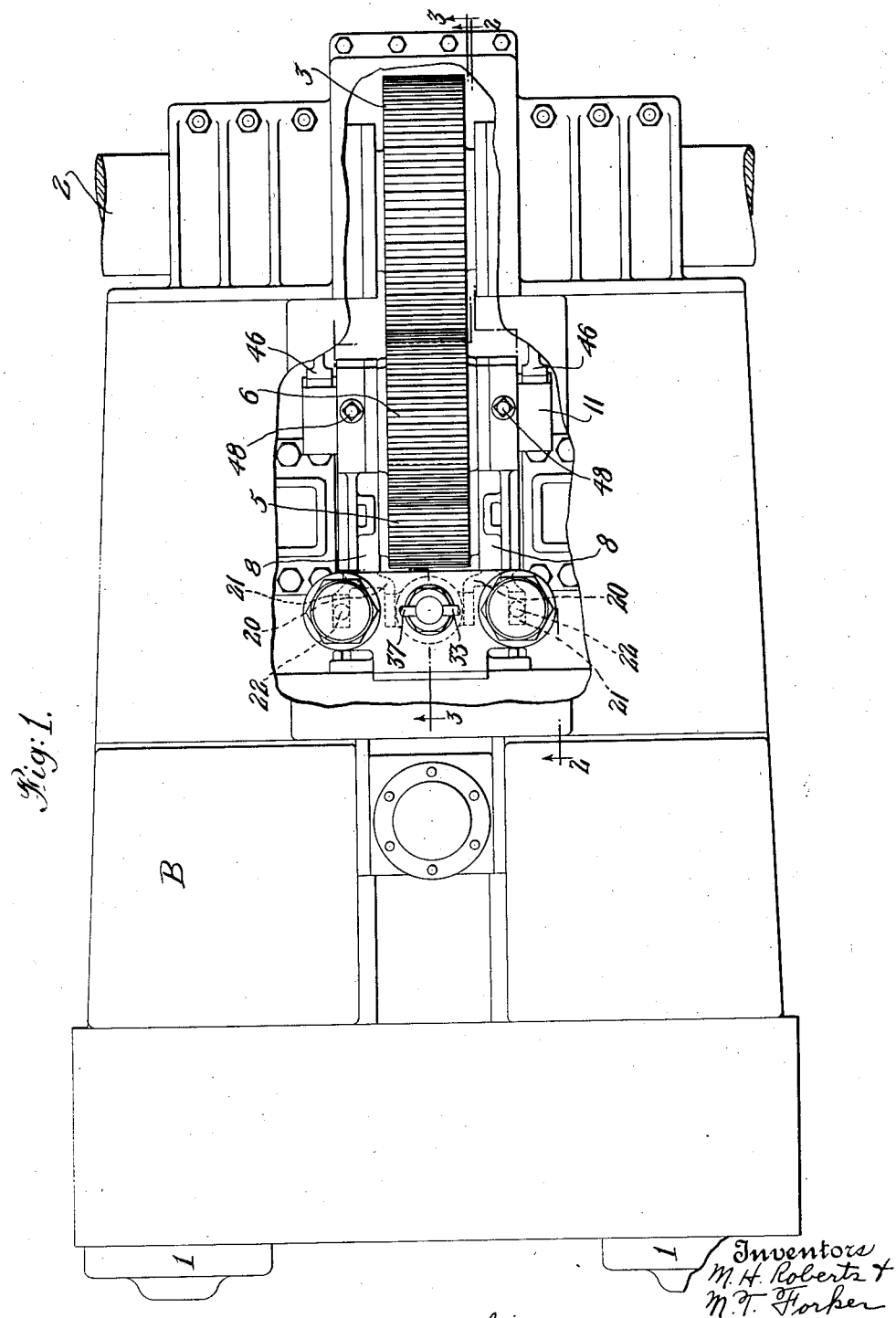

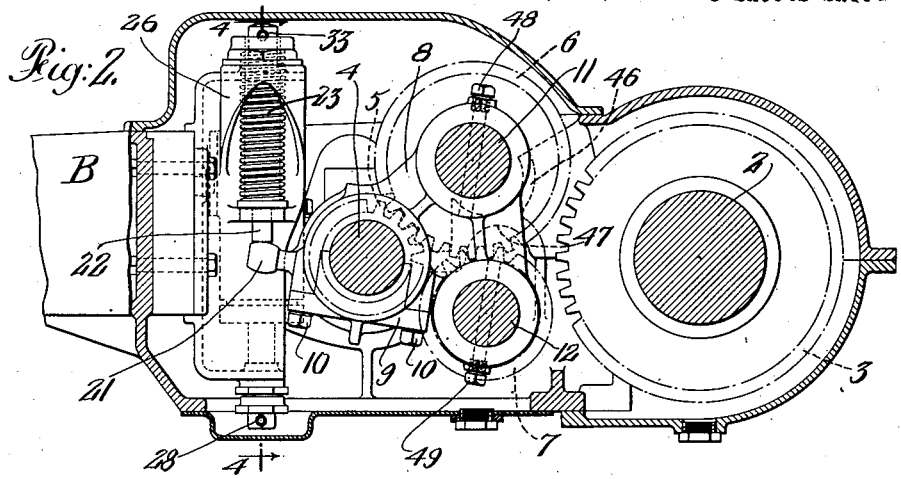
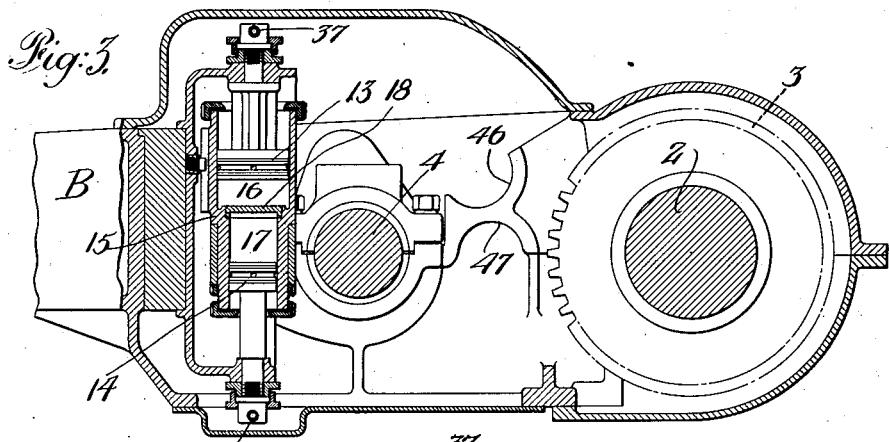
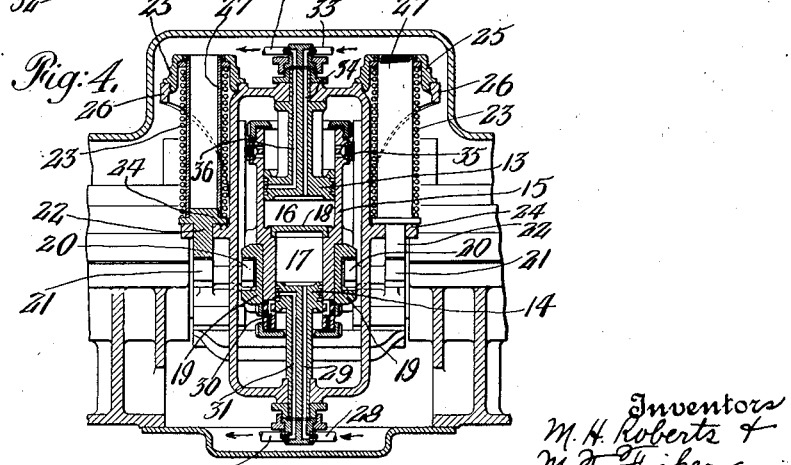

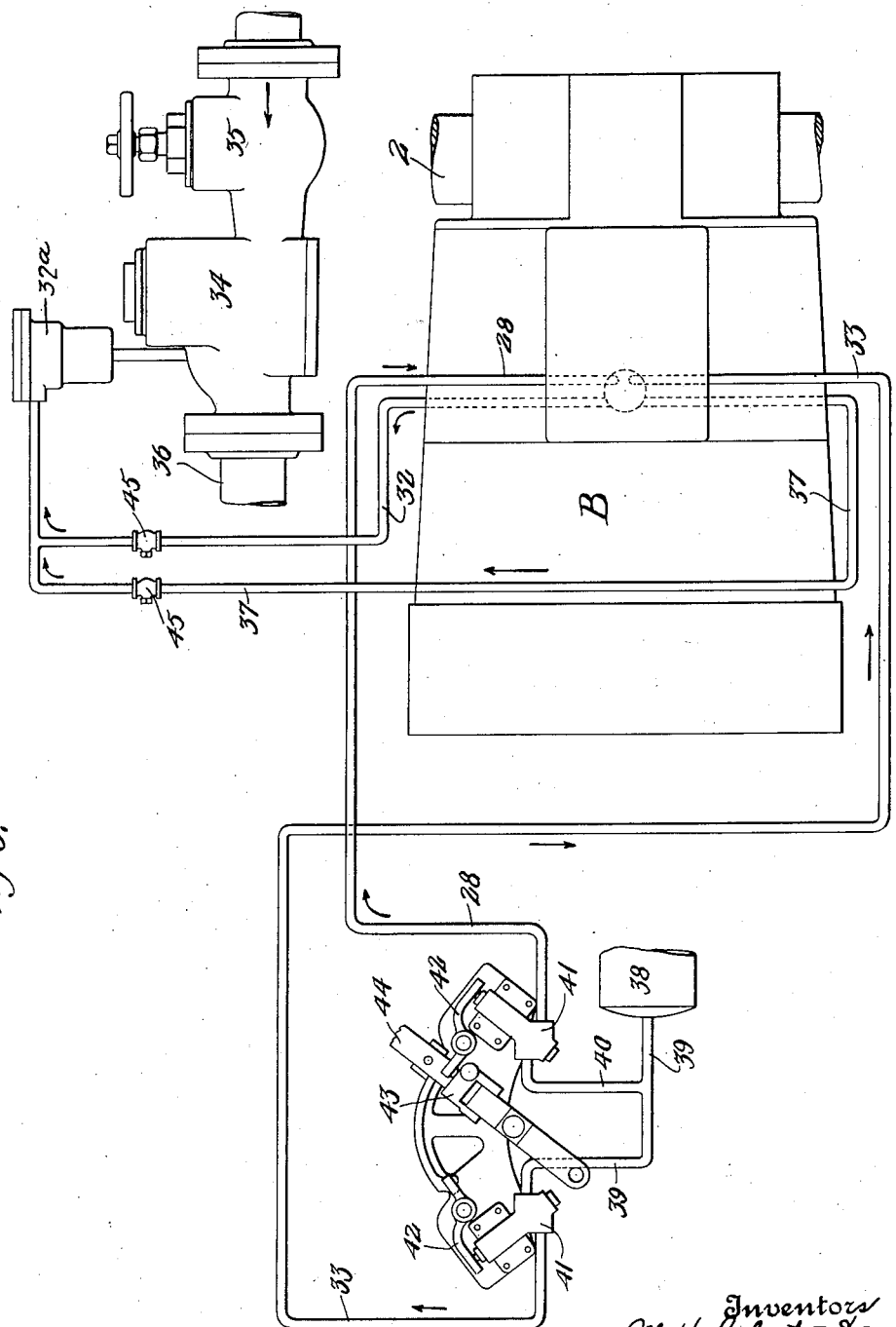

1,686,710

UNITED STATES PATENT OFFICE.

MONTAGUE H. ROBERTS, ENGLEWOOD, NEW JERSEY, AND MAJOR T. FORKER, OF NEW YORK, N. Y., ASSIGNORS TO FRANKLIN RAILWAY SUPPLY COMPANY, OF NEW YORK, N. Y., A CORPORATION OF DELAWARE.

LOCOMOTIVE BOOSTER.

Application filed October 20, 1926. Serial No. 142,974.

This invention relates to locomotive booster motors and is particularly concerned with the provision of an improved booster which can be used to aid the locomotive when traveling either in a forward or backward direction.

As is now well understood in this art booster motors are intended to aid the locomotive only in starting or at comparatively slow speeds where heavy pulling is encountered. They are normally arranged to drive an idle axle either on the locomotive or on the tender and when not in operation they are disconnected or disentrained from the axle which they are adapted to drive. A train of gears is customarily employed to connect the motor with the axle one of which is the driving pinion mounted upon the booster crank shaft, a second of which is the driven gear mounted upon the axle and the third of which is an idler gear at all times in mesh with the driving pinion but adapted to be moved into or out of mesh with the axle gear.

Since these booster motors are customarily non-reversible it will be readily understood that the entraining mechanism above briefly referred to will serve to aid the locomotive when traveling in one direction only, namely, forwardly. There are a number of reasons why reversible boosters have not been supplied, among which may be mentioned the lack of available space for the additional parts required, the necessity for positively holding the idler gear in a definite fixed driving position due to the immense strains to which it is subjected, and the desirability of making it possible to idle the booster to clear it of condensation and warm it up before it becomes a driving factor.

It is therefore the chief object of our invention to provide a simple and effective booster which can be used to aid the locomotive when going either forwardly or backwardly and in doing so we provide an apparatus which takes a minimum of space while at the same time arranging for the necessary preparatory idling and subsequent holding of the idler gears in proper driving position.

A further object of the invention is to reduce to a minimum the number of moving parts necessary to make the shifts for either forward or backward driving and in this connection we mount a pair of idler gears upon a single moving or rocking element.

We have illustrated our invention in the accompanying drawings which disclose a preferred embodiment and wherein Fig. 1 is a plan view of the booster motor with a portion of the casing broken away to illustrate various details of the entraining mechanism;

Fig. 2 is a section on the line 2—2 of Fig. 1;

Fig. 3 is a section on the line 3—3 of Fig. 1;

Fig. 4 is a section on the line 4—4 of Fig. 2; and

Fig. 5 is a diagrammatic lay-out illustrating the principal features of a controlling system for our improved booster.

In the last mentioned figure the only parts of the control mechanism which are illustrated are those which are directly related to the movement of the entraining gears inasmuch as the control as a whole forms no part of our invention.

Referring to the drawings it will be seen that the booster motor B having the cylinders 1 is mounted at one end upon the axle 2 which it is designed to drive. The axle carries the driven gear 3 and the booster crank shaft 4 carries the driving pinion 5.

Between the pinion 5 and the axle gear 3 we locate a pair of idler gears one of which, 6, is larger than the other, 7. (See particularly Fig. 2.) Both idlers are carried by a rocking member 8 which is arranged to pivot upon the crank shaft 4. The first idler gear 6 is always in mesh with the driving pinion 5 and the second idler gear 7 is always in mesh with the first idler gear 6 but in normal or neutral position the two idlers are free of the axle gear 3, which is the position illustrated in Fig. 2. This member 8 is secured in its position on the crank shaft 4 by means of a cap 9 and bolts 10 at each side of the driving pinion 5.

Between the sides of the rocker 8 are mounted the idler gears 6 and 7 upon the pins 11 and 12. In other words the rocker is in reality primarily made up of two side pieces connected together at their free ends by the pins 11 and 12. With reference to Fig. 2 when the rocker is moved to the right the gear 6 will be thrown into mesh with the gear 3 without at the same time bringing the idler 7 into conflict with either the gear 3 or the pinion 5 and when the rocker is moved to the left gear 7 is brought into mesh with gear 3 without bringing gear 6 into any position of conflict. In the first instance the chain of gears 5, 6 and 3 drives the axle 2 forwardly while in the second instance the chain of gears 5, 6, 7 and 3 drives the axle 2 backwardly. The position of the rocker with its idler gears is controlled by means of an improved motor device the details of which will now be described.

The booster structure is provided with a pair of fixed pistons 13 and 14 which may be described as oppositely disposed with their axes in alignment. (See particularly Figs. 3 and 4). The piston 13 is of larger diameter than the piston 14 and a movable cylinder 15 with chambers of corresponding diameter, which we have referred to by the characters 16 and 17, is fitted for reciprocation over the ends of the pistons. The two chambers are divided by an interior division wall 18. Motion of the cylinder is imparted to the rocker thru the medium of the yoke members 19 each of which engages one arm 20 of the forked end of a side member 8. (See particularly Figs. 1 and 4).

The other arm 21 of the forked end of each side member 8 projects outwardly into the path of movement of the plungers 22 which are normally urged downwardly by means of the springs 23.

The springs 23 react between these plungers 22 which are adapted to seat against the projecting stop lugs 24 and a collar member 25 which can be screw threaded into the supporting bracket 26. Within the springs are sleeves 27.

It will, therefore, be seen that under normal conditions when the booster is not entrained the springs 23 will move the rocker to the position indicated in Fig. 2 where neither idler gear is in mesh with the axle gear 3. It should be noted that the rocker 8 is so constructed as to normally tend to swing under the influence of gravity in a direction which would mesh the idler 6 with the axle gear 3, this action, however, being prevented by the pressure of the springs 23. The idlers are at all times in driving connection with the pinion 5 but are yieldingly held out of mesh with the axle gear 3 and while free of the gear 3 the booster can be idled so as to clear it of condensation and warm it up preparatory to its becoming a driving factor. The springs have only a limited movement because of the stops 24 whereby the rocker is brought to a neutral position with the idlers out of mesh with the axle gear 3 which at the same time motion of the rocker is possible in either direction. When it is desired to entrain the booster fluid pressure is admitted to one or the other of the cylinder ends 16 or 17 as determined by the direction in which the locomotive is to be driven. If the locomotive is to be driven forwardly the pressure is admitted to the chamber 17 thru the conduit 28 and port 29 within the piston body 14. The cylinder will then move upwardly until the gear 6 is brought into mesh with the gear 3 at which time the by-pass 30 in the cylinder wall will establish communication between the chamber 17 and the outlet port 31. The fluid pressure is then free to pass on thru the conduit 32 to the booster throttle operating cylinder 32ª (see Fig. 5) which device is now well known in this art and, therefore, will not be described specifically. The action of this latter device opens the booster throttle within the casing 34 and permits steam which comes in thru the valve body 35 in the direction indicated by the arrow to pass on down to the booster thru the booster supply pipe 36.

The booster then becomes operative as a driving factor to aid the locomotive in a forward direction in a manner well understood in this art.

When it is desired to drive the booster backwardly fluid pressure is admitted to the chamber 16 thru the conduit 33 and port 34 in the piston body 13. This will move the cylinder 15 downwardly and when it has reached the limit of its travel the by-pass 35 will connect the chamber 16 with the outlet port 36 so that the air pressure is free to travel thru the conduit 37 to the booster throttle operating cylinder 33. This will entrain the booster so as to drive the locomotive backwardly and at the same time open the booster throttle in the manner already indicated and familiar to those skilled in the art.

When the booster is entrained whether driving forwardly or backwardly suitable stops 46 and 47 are provided so as to prevent the idler gears 6 or 7 from becoming wedged with the gear 3 during operation. The pins 11 and 12 project outwardly sufficiently far to engage the stops and the pins are held in position by means of the bolts 48 and 49.

The arrangement is such that the following effect is produced. When driving forwardly the resultant of the forces acting upon the idler 6 tends to urge it downwardly in a direction substantially at right angles to the plane of the stop 46 so that it is held in meshed position while in reverse operation the resultant of the forces tends to urge the idler 7 upwardly in a direction substantially at right angles to the plane of the stop 47 so that said idler 7 is likewise held in its meshed position. Contrariwise, when the booster is being cut out or disentrained the axle gear 3 applies torque to the idlers just as the idlers applied torque to the axle gear when the booster was in operation and the resultant of the forces so set up tends to throw the idlers out of mesh with the axle gear.

Referring specifically to Fig. 5, it is first desired to call attention at this point to the fact that this figure is a purely diagrammatic one and that it does not disclose all of the controlling apparatus now employed in operating a booster. It does indicate, however, all that it is necessary to show in order to fairly disclose the present invention but if further details are desired reference can be had to the United States patent to Peters No. 1,470,761 issued on October 16th, 1923. The fluid pressure is preferably supplied from the reservoir 38 which communicates thru the conduits 39 and 40 with the reverse lever pilot valves 41. These pilot valves are opened thru the medium of the rocking members 42 upon operation of the latch 43 which latter is mounted upon the reverse lever 44 in a manner which is also understood in this art and which can be seen more in detail in the patent referred to. Check valves 45 are provided in the pipes 32 and 37 in order to prevent back flow of fluid pressure in one pipe while the supply is being made to the other.

We claim:—

1. A locomotive booster apparatus comprising in combination, a booster driven pinion, an axle gear, an idler gear in mesh with the pinion, a second idler gear in mesh with the first, a movable member carrying both of said idler gears, and motor means for moving said member in one direction to mesh the first idler gear with the axle gear and in the reverse direction to mesh the second idler gear with the axle gear.

2. A locomotive booster apparatus comprising in combination, a booster driven pinion, an axle gear, an idler gear in mesh with the pinion, a second idler gear in mesh with the first, means for moving said idler gear so as to mesh the first mentioned with the axle gear without bringing about conflict with the second, and means for moving said idlers so as to mesh the second with the axle gear without bringing about conflict with the first.

3. A locomotive booster apparatus comprising in combination, a booster driven pinion, an axle gear, an idler gear in mesh with the pinion, a second idler gear in mesh with the first, a movable member carrying both of said idler gears, motor means for moving said member in one direction to mesh the first idler gear with the axle gear and in the reverse direction to mesh the second idler gear with the axle gear and means for holding said movable member in a position with both idlers free of the axle gear whenever the booster is not in operation.

4. A locomotive booster apparatus comprising in combination, a booster driven pinion, an axle gear, an idler gear between said pinion and said axle gear in mesh with the pinion, a second and smaller idler between the pinion and the axle gear in mesh with said first idler, a movable member carrying both of said idler gears, and motor means for moving said member in one direction to mesh the first idler gear with the axle gear and in the reverse direction to mesh the second idler gear with the axle gear.

5. A locomotive booster apparatus comprising in combination, a booster driven pinion, an axle gear, an idler gear between said pinion and said axle gear in mesh with the pinion, a second and smaller idler between the pinion and the axle gear in mesh with said first idler, a movable member carrying both of said idler gears, a motor means for moving said member in one direction to mesh the first idler gear with the axle gear and in the reverse direction to mesh the second idler gear with the axle gear and means for holding said movable member in a position with both idlers free of the axle gear whenever the booster is not in operation.

6. A locomotive booster apparatus comprising in combination, a booster driven pinion, an axle gear, an idler gear in mesh with the pinion, a second idler gear in mesh with the first, a movable member carrying both of said idler gears, yielding means normally urging said member in a direction to mesh the second idler with said axle gear, stop means for limiting said movement whereby both idlers are held in a position free of the axle gear when the booster is not in operation, and motor means for moving said member in one direction to mesh the first idler gear with the axle gear and in the reverse direction to mesh the second idler gear with the axle gear.

7. A locomotive booster apparatus comprising in combination, a booster driven pinion, an axle gear, an idler gear in mesh with the pinion, a second idler gear in mesh with the first, a movable member carrying both of said idler gears, a motor means for moving said member in one direction to mesh the first idler gear with the axle gear and in the reverse direction to mesh the second idler gear with the axle gear, and stop means for limiting the movement of said member.

8. An apparatus for entraining locomotive booster motors comprising in combination, a train of gears for forward motion, a train of gears for backward motion, and a motor for entraining one or the other of said gear trains, said motor including a movable cylinder, a fixed piston in each end of said cylinder, a partition between the piston heads, and means for admitting fluid pressure to one or the other of said piston heads for causing movement of the cylinder in the direction necessary for either forward or backward motion as may be necessary.

9. A booster entraining motor comprising in combination, a pair of fixed pistons oppositely disposed, a movable cylinder with an end fitting over each piston, a wall in the cylinder between the pistons, means normally holding said cylinder in a neutral position, and means for admitting fluid pressure to one or the other of the ends of said cylinder for moving it in the direction desired.

10. A locomotive booster apparatus comprising in combination, a booster driven pinion, an axle gear, an idler gear in mesh with the pinion, a second idler gear in mesh with the first, a movable member carrying both of said idler gears, means holding the movable member with its idlers in a neutral position, and motor means for moving said member so as to bring one or the other idler gear into mesh with the axle gear.

11. A locomotive booster apparatus comprising in combination, a booster driven pinion, an axle gear, an idler gear in mesh with the pinion, a second idler gear in mesh with the first, a movable member carrying both of said idler gears, said member being mounted to swing around the axis of the pinion, and motor means for moving said member in one direction around said pinion axis to mesh the first idler gear with the axle gear and in the reverse direction to mesh the second idler gear with the axle gear.

12. A locomotive booster apparatus comprising in combination, a booster driven pinion, an axle gear, an idler gear in mesh with the pinion, a second idler gear in mesh with the first, a movable member carrying both of said idler gears, said member being mounted to swing around the axis of the pinion, motor means for moving said member in one direction around said pinion axis to mesh the first idler gear with the axle gear and in the reverse direction to mesh the second idler gear with the axle gear and means for yieldingly holding said member in neutral position when the booster is not in operation.

13. A locomotive booster apparatus comprising in combination, a booster driven pinion, an axle gear, an idler gear in mesh with the pinion, a second idler gear in mesh with the first, a movable member carrying both of said idler gears, said member being mounted to swing around the axis of the pinion, means acting in one direction for bring said member to neutral position, and motor means for moving said member in one direction or the other around said pinion axis to mesh one or the other idler gear with the axle gear.

14. A locomotive booster apparatus comprising in combination, a booster driven pinion; an axle gear spaced therefrom; an idler gear in mesh with said pinion and mounted between the pinion and the axle gear for movement which is adapted to bring it into mesh with the axle gear so that the resultant of the driving forces, when the booster is in operation, tends to maintain said idler in mesh with the axle gear and so that the axle gear, when the booster is not in operation, tends to force the idler out of mesh with itself; and a second and smaller idler gear in mesh with said first idler and mounted between the pinnon and the axle gear for movement which is adapted to bring it into mesh with the axle gear so that the resultant of the driving forces, when the booster is in operation, tends to maintain said second idler in mesh with the axle gear and so that the axle gear, when the booster is not in operation tends to force said second idler out of mesh with itself.

15. A locomotive booster apparatus comprising in combination, a booster driven pinion; an axle gear spaced therefrom; an idler gear in mesh with said pinion and mounted between the pinion and the axle gear for movement which is adapted to bring it into mesh with the axle gear so that the resultant of the driving forces, when the booster is in operation, tends to maintain said idler in mesh with the axle gear and so that the axle gear, when the booster is not in operation, tends to force the idler out of mesh with itself; a second and smaller idler gear in mesh with said first idler and mounted between the pinion and the axle gear for movement which is adapted to bring it into mesh with the axle gear so that the resultant of the driving forces, when the booster is in operation, tends to maintain said second idler in mesh with the axle gear and so that the axle gear, when the booster is not in operation, tends to force said second idler out of mesh with itself, means normally holding said idlers out of mesh with the axle gear, and motor means for moving one or the other idler into mesh with the axle gear.

16. A locomotive booster apparatus comprising in combination, a booster driven pinion, an axle gear, an idler gear in mesh with the pinion, a second idler gear in mesh with the first, a movable member carrying both of said idler gears, means holding the movable member with its idlers in a neutral position, motor means for moving said member so as to bring one or the other idler gear into mesh with the axle gear, and stop means for limiting the movement of said member in either direction.

17. A locomotive booster apparatus comprising in combination, a booster driven pinion, an axle gear, an idler gear between said pinion and said axle gear located to one side of a line drawn thru their centers, a second idler gear between said pinion and said axle gear on the opposite side of said line, and means for rocking said idler gears around the axis of said pinion in one direction or the other to mesh either the first idler with the axle gear to drive the axle in one direction or the second idler with the axle gear to drive the axle in the opposite direction.

18. A locomotive booster apparatus comprising in combination, a booster driven pinion, an axle gear, an idler gear between said pinion and said axle gear located to one side of a line drawn thru their centers, a second idler gear between said pinion and said axle gear on the opposite side of said line, a movable member carrying both of said idlers, said member being mounted to swing around the axis of said pinion, and means for moving said member in one direction or the other around the axis of said pinion to mesh either the first idler with the axle gear to drive the axle in one directon or the second idler with the axle gear to drive the axle in the opposite direction.

19. A locomotive booster apparatus comprising in combination, a booster driven pinion, an axle gear, in idler gear between said pinion and said axle gear normally out of mesh with said axle gear and located to one side of a line drawn thru their centers, said idler gear being mounted for movement which is adapted to bring it into mesh with the axle gear for forward motion of the locomotive so that the driving forces, when the booster is in operation, act to maintain the idler in mesh with the axle gear and so that the reacting forces from the axle gear, when the booster is not in operation, result in forcing the idler out of mesh with the axle gear; and a second idler gear between said pinion and said axle gear also normally out of mesh with the axle gear but located on the other side of a line drawn thru their centers, said second idler being mounted for movement which is adapted to bring it into mesh with the axle gear for backward motion of the locomotive so that the driving forces, when the booster is in operation, act to maintain said second idler in mesh with the axle gear and so that the reacting forces from the axle gear, when the booster is not in operation, result in forcing said second idler out of mesh with the axle gear.

20. A locomotive booster apparatus comprising in combination, a booster driven pinion, an axle gear, an idler gear between said pinion and said axle gear normally out of mesh with said axle gear and located to one side of a line drawn thru their centers, said idler gear being mounted for movement which is adapted to bring it into mesh with the axle gear for forward motion of the locomotive so that the driving forces, when the booster is in operation, act to maintain the idler in mesh with the axle gear and so that the reacting forces from the axle gear, when the booster is not in operation, result in forcing the idler out of mesh with the axle gear; and a second idler gear between said pinion and said axle gear also normally out of mesh with the axle gear but located on the other side of a line drawn thru their centers, said second idler being mounted for movement which is adapted to bring it into mesh with the axle gear for backward motion of the locomotive so that the driving forces, when the booster is in operation, act to maintain said second idler in mesh with the axle gear and so that the reacting forces from the axle gear, when the booster is not in operation, result in forcing said second idler out of mesh with the axle gear, together with means for causing either the first or the second idler gear to mesh with the axle gear as may be desired.

21. A locomotive booster apparatus comprising in combination, a booster driven pinion, an axle gear, an idler gear between said pinion and said axle gear normally out of mesh with said axle gear and located to one side of a line drawn thru their centers, a second idler gear between said pinion and said axle gear also normally out of mesh with the axle gear but located on the other side of a line drawn thru their centers, and a movable member carrying both of said idlers, said member being mounted to swing around the axis of the pinion and adapted, when rocked in one direction, to bring the first idler into mesh with the axle gear to drive the axle in one direction so that the driving forces, when the booster is in operation, act to maintain said first idler in mesh with the axle gear and so that the reacting forces from the axle gear, when the booster is not in operation, result in forcing said first idler out of mesh with the axle gear; and, when rocked in the other direction, to bring said second idler gear into mesh with the axle gear to drive the axle in the opposite direction so that the driving forces, when the booster is in operation, act to maintain said second idler in mesh with the axle gear and so that the reacting forces from the axle gear, when the booster is not in operation, result in forcing said second idler out of mesh with the axle gear.

22. A locomotive booster apparatus comprising in combination, a booster driven pinion, an axle gear, an idler gear between said pinion and said axle gear normally out of mesh with said axle gear and located to one side of a line drawn thru their centers, a second idler gear between said pinion and said axle gear also normally out of mesh with the axle gear but located on the other side of a line drawn thru their centers, a movable member carrying both of said idlers, said member being mounted to swing around the axis of the pinion and adapted, when rocked in one direction, to bring the first idler into mesh with the axle gear to drive the axle in one direction so that the driving forces, when the booster is in operation, act to maintain said first idler in mesh with the axle gear and so that the reacting forces from the axle gear, when the booster is not in operation, result in forcing said first idler out of mesh with the axle gear; and, when rocked in the other direction, to bring said second idler gear into mesh with the axle gear to drive the axle in the opposite direction so that the driving forces, when the booster is in operation, act to maintain said second idler in mesh with the axle gear and so that the reacting forces from the axle gear, when the booster is not in operation, result in forcing said second idler out of mesh with the axle gear, and motor means for rocking said member in one direction or the other.

23. A locomotive booster apparatus comprising in combination, a booster driven pinion, an axle gear, an idler gear between said pinion and said axle gear normally out of mesh with said axle gear and located to one side of a line drawn thru their centers, a second idler gear between said pinion and said axle gear also normally out of mesh with the axle gear but located on the other side of a line drawn thru their centers, a movable member carrying both of said idlers, said member being mounted to swing around the axis of the pinion and adapted, when rocked in one direction, to bring the first idler into mesh with the axle gear to drive the axle in one direction so that the driving forces, when the booster is in operation, act to maintain said first idler in mesh with the axle gear and so that the reacting forces from the axle gear, when the booster is not in operation, result in forcing said first idler out of mesh with the axle gear; and, when rocked in the other direction, to bring said second idler gear into mesh with the axle gear to drive the axle in the opposite direction so that the driving forces, when the booster is in operation, act to maintain said second idler in mesh with the axle gear and so that the reacting forces from the axle gear, when the booster is not in operation, result in forcing said second idler out of mesh with the axle gear, and motor means for rocking said member in one direction or the other, together with means for maintaining said member in a position with both idlers out of mesh with the axle gear when the booster is not in operation.

24. A locomotive booster apparatus comprising in combination, a booster driven pinion, an axle gear, an idler gear between said pinion and said axle gear normally out of mesh with said axle gear and located to one side of a line drawn thru their centers, a second idler gear between said pinion and said axle gear also normally out of mesh with the axle gear but located on the other side of a line drawn thru their centers, a movable member carrying both of said idlers, said member being mounted to swing around the axis of the pinion and adapted, when rocked in one direction, to bring the first idler into mesh with the axle gear to drive the axle in one direction so that the driving forces, when the booster is in operation, act to maintain said first idler in mesh with the axle gear and so that the reacting forces from the axle gear, when the booster is not in operation, result in forcing said first idler out of mesh with the axle gear; and, when rocked in the other direction, to bring said second idler gear into mesh with the axle gear to drive the axle in the opposite direction so that the driving forces, when the booster is in operation, act to maintain said second idler in mesh with the axle gear and so that the reacting forces from the axle gear, when the booster is not in operation, result in forcing said second idler out of mesh with the axle gear, and motor means for rocking said member in one direction or the other, together with means for maintaining said member in a position with both idlers out of mesh with the axle gear when the booster is not in operation and stop means for limiting the movement of said member in either direction to the position for proper meshing of the gears.

25. A locomotive booster apparatus comprising in combination, a booster driven pinion, an axle gear, an idler gear between said pinion and said axle gear located to one side of a line drawn thru their centers, a second idler gear between said pinion and said axle gear on the opposite side of said line, a movable member carrying both of said idlers, said member being mounted to swing around the axis of said pinion, means for yieldingly holding said member in neutral position when the booster is not in operation, and means for moving said member in one direction or the other around the axis of said pinion to mesh either the first idler with the axle gear to drive the axle in one direction or the second idler with the axle gear to drive the axle in the opposite direction.

In testimony whereof we have hereunto signed our names.

MONTAGUE H. ROBERTS.
MAJOR T. FORKER.